(No Model.)  3 Sheets—Sheet 1.

A. HILL.
VALVE GEAR FOR STEAM PUMPS.

No. 338,152.  Patented Mar. 16, 1886.

Witnesses:
Inventor:
A. Hill
By Munn & Co.
Attorneys (No Model.)  3 Sheets—Sheet 3.
A. HILL.
VALVE GEAR FOR STEAM PUMPS.

No. 338,152. Patented Mar. 16, 1886.

Witnesses:

Inventor:
A. Hill
By Munn & Co.
Attorneys

United States Patent Office.

ABRAHAM HILL, OF MARLBOROUGH, COUNTY OF WILTS, ENGLAND.

VALVE-GEAR FOR STEAM-PUMPS.

SPECIFICATION forming part of Letters Patent No. 338,152, dated March 16, 1886.

Application filed November 8, 1884. Serial No. 147,455. (No model.) Patented in England October 8, 1884, No. 13,347; in France October 21, 1884, No. 164,918; in Belgium October 22, 1884, No. 66,667, and in Germany November 7, 1884, No. 31,615.

*To all whom it may concern:*

Be it known that I, ABRAHAM HILL, a subject of the Queen of Great Britain, residing at 3 Bridge Buildings, Marlborough, in the county of Wilts, England, locomotive-engine driver, have invented an Improved Valve-Gear for Steam-Engines, of which the following is a specification.

This invention relates to an improved valve motion for locomotives, double-cylinder stationary, portable, traction, marine, or other engines, in which one engine or cylinder can be made to work the valve of the other.

In ordinary engines in which the valves are worked by eccentrics the motion of the valve is slower at the commencement and end than at the middle of its stroke. The steam is consequently admitted to the cylinder but slowly at first, and the piston does not therefore receive the full pressure of steam until it has traveled some distance. Similarly the steam is cut off slowly, the comparatively slow motion of the valve at the commencement and end of its stroke thus giving rise in both instances to the evil known as "wire-drawing." Moreover, the eccentrics cause considerable friction, occupy space on the crank-shaft, and when there is any play in the bearings of the crank-shaft the eccentrics partake in this play of the shaft and communicate it to the valves, thereby causing the engine to work very irregularly.

The object of my invention is to avoid these imperfections by substituting for the eccentrics in double-cylinder engines a gear whereby the valves will be caused to open and shut quickly, the said gear being operated from the piston-rod cross-heads, the cross-head of each engine working the valve of the other. The valve-gear being wholly independent of the crank-shaft is unaffected by any play of the latter.

For convenience I will describe the gear as applied to a locomotive, but it will be understood that it can be applied to all double-cylinder engines in which one engine can be made to work the valve of the other.

Figure 1:
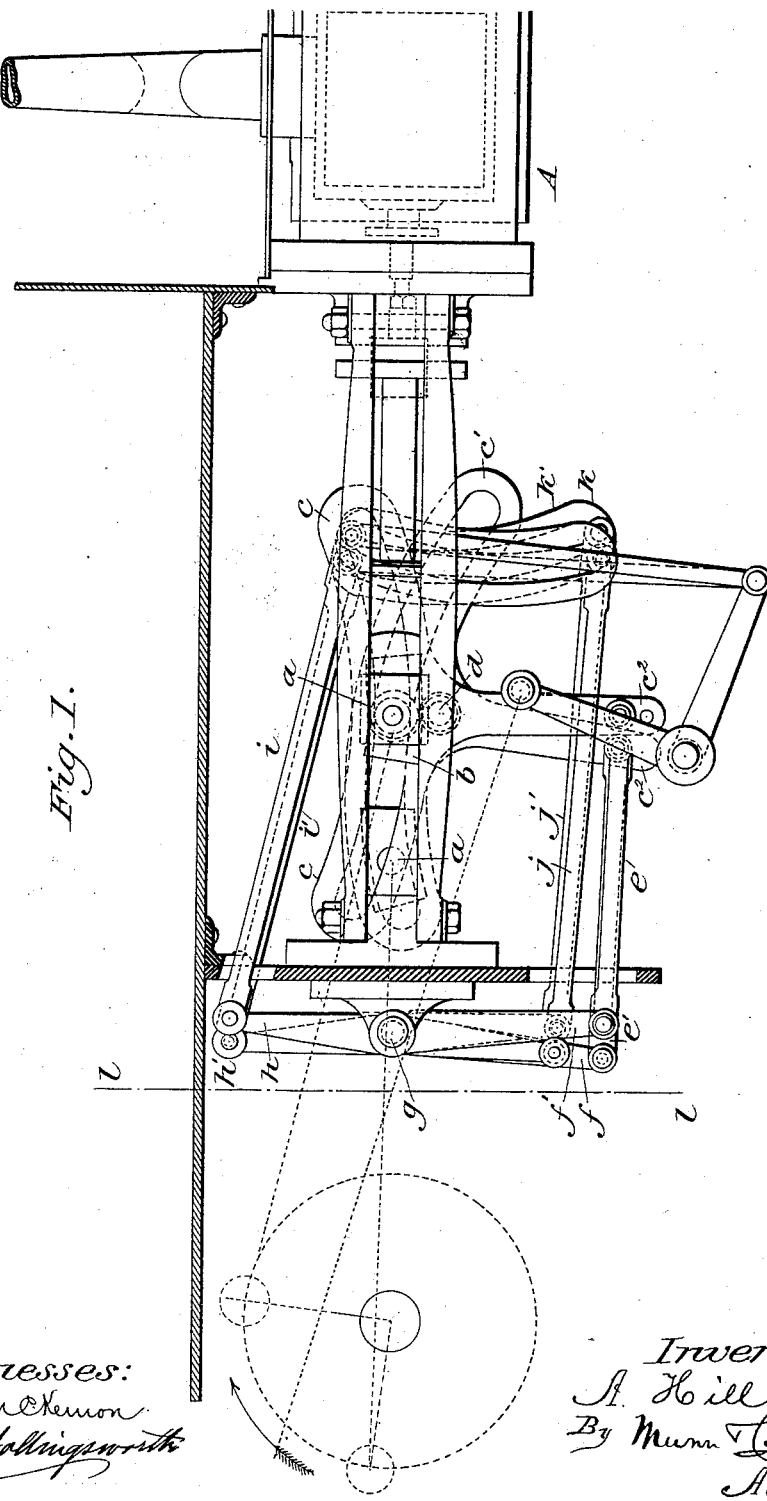
Figure 2:
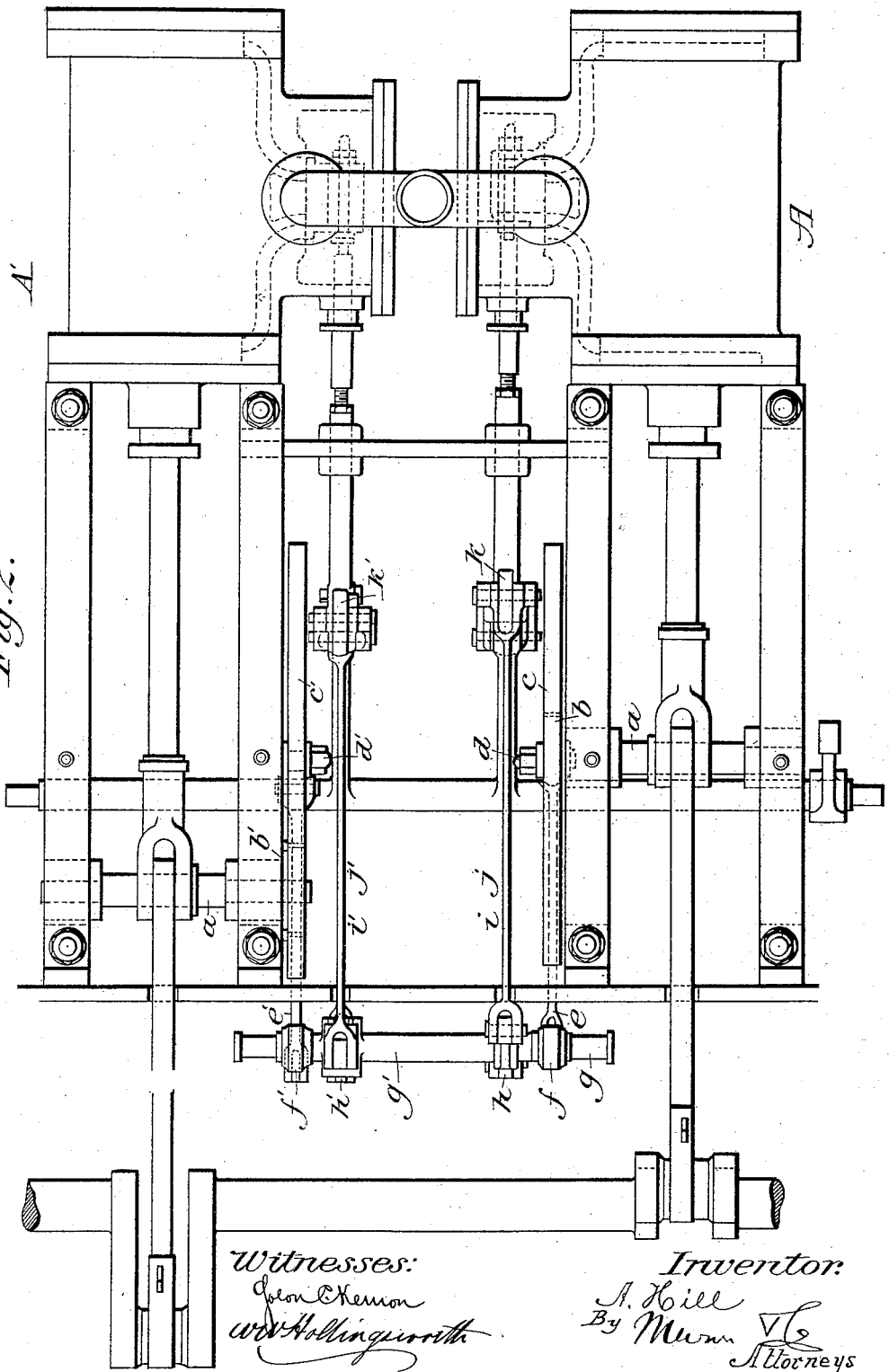
Figure 3:
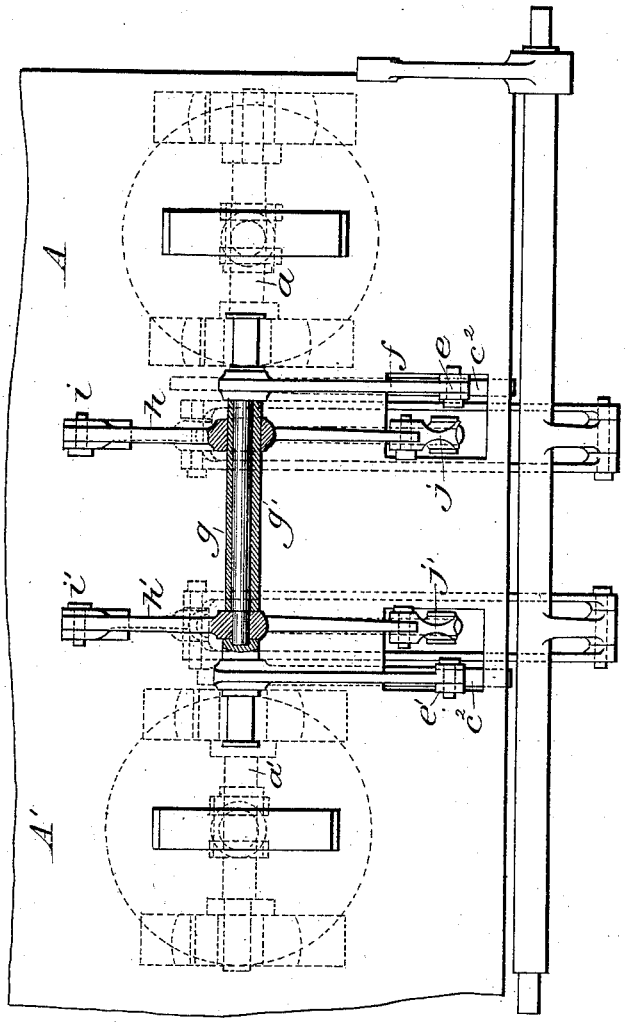

Reference is to be had to the accompanying drawings, forming part of this specification, wherein Figure 1 is a side elevation of part of a locomotive with the side frame removed. Fig. 2 is a plan, and Fig. 3 is a sectional elevation on line 1 1 in Figs. 1 and 2.

The locomotive is supposed to be running in forward gear, as shown by the arrow.

The nearer engine or cylinder is designated A, and the farther one A'. The cylinders, the valves, (with the exception of the lead and lap,) the pistons, cross-heads, slide-bars, connecting-rods, and reversing-gear are similar to the like parts in the ordinary locomotive, and need no special description. Alongside the guides of each cross-head is pivoted (at a point, $d$ or $d'$, opposite the middle of the cross-head stroke, and at a suitable distance from the plane of motion of the cross-head) a slide-link or its equivalent, preferably in the form of a T-shaped lever, of which the cross-member $c$ or $c'$ is slotted and curved to suit the direction and extent of travel of the valve. In this slotted member works a slide-block, $b$ or $b'$, pivoted on the pin $a$ or $a'$ of the adjacent cross-head, the to-and-fro motion of this slide-block in the slotted member producing an oscillating motion of the T-lever.

In the example shown the T-levers are situated outside the cross-head guides and on the side nearest the center of the engine, and are pivoted to one of the cross-head guides at a point below the plane of the cross-heads; but the levers might be variously arranged according to circumstances, the operation being similar in all cases. When both T-levers are pivoted on the same side of the plane of motion of the cross-head, their slotted members must be oppositely curved. The other members, $c^2$, of these levers are respectively coupled by connecting-rods $e$ $e'$ to levers $f$ $f'$, fixed, respectively, on solid and tubular rocking shafts $g$ and $g'$, working the one inside the other, and which are carried in bearings, which may be bolted to the cross-plate carrying the slide-bars. On the inner rocking shaft, $g'$, is fixed a two-armed lever, $h'$, connected by the two rods $i'$ and $j'$ to the reversing-link $k'$, which is placed, as shown, with its concavity toward the valve—that is, the contrary of the position of the same link in the ordinary locomotive—this position being necessary, because the rods are not radial to the shaft which works them. This reversing-link acts on the ordinary valve-rod in the usual way.

On the external rocking shaft, $g$, is fixed a two-armed lever, $h$, connected by rods $i$ and $j$ to a reversing-link, $k$, which is similar to $k'$. The means of shifting the position of the links $k$ and $k'$ is similar to that in ordinary use.

The valves should have a very slight amount of lap on the steam side, (say one-eighth of an inch,) and a slight clearance on the exhaust side, (say, one-sixteenth of an inch;) but the proportions here mentioned may be varied according to circumstances.

Suppose the engine to be in the position shown in the drawings, when steam is turned on the engine A receives full steam and turns the crank-shaft, as shown by the arrow. Immediately the cross-head of this engine begins to move from its central position it begins to move the valve of the other engine, A′, which is thereby quickly opened to its full extent, both because the cross-head of an engine travels quickest at the middle of its stroke, and also on account of the short leverage at which the cross-head acts on the slotted member of the T-lever when the cross-head is near the middle of its stroke. This leverage is greatest when the cross-head reaches the ends of its stroke, and the motion of the valve thereby operated is consequently slowest at the ends of its travel when it is full open and quickest at the moment of cutting off and admitting the steam.

Having now particularly described and ascertained the nature of my said invention, and in what manner the same is to be performed, I declare that what I claim is—

1. In a valve-gear for duplex engines in which the valve of one engine is operated by the other engine, the combination, with reciprocating cross-heads, of centrally-pivoted levers having uniformly-curved slots and slide-blocks pivoted to the cross-heads and working in the slots of the said levers, substantially as herein shown and described, whereby the motion of the valves will be slowest at the end of its travel when it is full open, and quickest at the moment of cutting off and admitting steam, as set forth.

2. In valve-gear for duplex engines in which the valve of one engine is operated by the other engine, the combination, with a piston cross-head, of a T-shaped lever having a uniformly-curved slot in its cross member, and pivoted on an axis at right angles to the direction of motion of the piston-rod, and a slide-block pivoted to the cross-head and working in the said curved slot, substantially as herein shown and described.

3. In valve-gear for duplex engines in which the valve of one engine is operated by the other engine, the combination, with slotted T-shaped levers pivoted on an axis at right angles to the direction of motion of the piston-rod and having the slide-blocks $b\ b'$ pivoted to the piston cross-heads, of the rock-shafts $g\ g'$, the levers $f\ f'$ on the said rock-shafts, and their rods $e\ e$, connecting said levers to the member $c^2$ of the T-shaped lever, substantially as herein shown and described.

4. In a valve-gear for engines, the combination, with slotted T-shaped levers, slide-blocks $b\ b'$, pivoted to the piston cross-heads, the rock-shaft $g\ g'$, the levers $f\ f'$, and the connecting-rods $e\ e'$, of the reversing-links $k\ k'$, the levers $h\ h'$, and connecting-rods $i\ i'\ j\ j'$, substantially as herein shown and described.

ABRAHAM HILL.

Witnesses:
ABRAHAM HILL, Jr.,
*No. 3 Bridge Buildings, Marlborough, Wilts.*
WALTER JAMES S. RERTEN,
*Clerk to Messrs. Scorer & Harris, 17 Gracechurch St., London.*